Jan. 20, 1953

J. B. EZELL ET AL 2,626,070

MATERIAL HANDLING DEVICE

Filed Dec. 17, 1951

INVENTOR
JAMES B. EZELL
JESSE G. TUCKER JR.

BY Cushman, Darby & Cushman

ATTORNEYS

Jan. 20, 1953 J. B. EZELL ET AL 2,626,070
MATERIAL HANDLING DEVICE
Filed Dec. 17, 1951 3 Sheets-Sheet 2
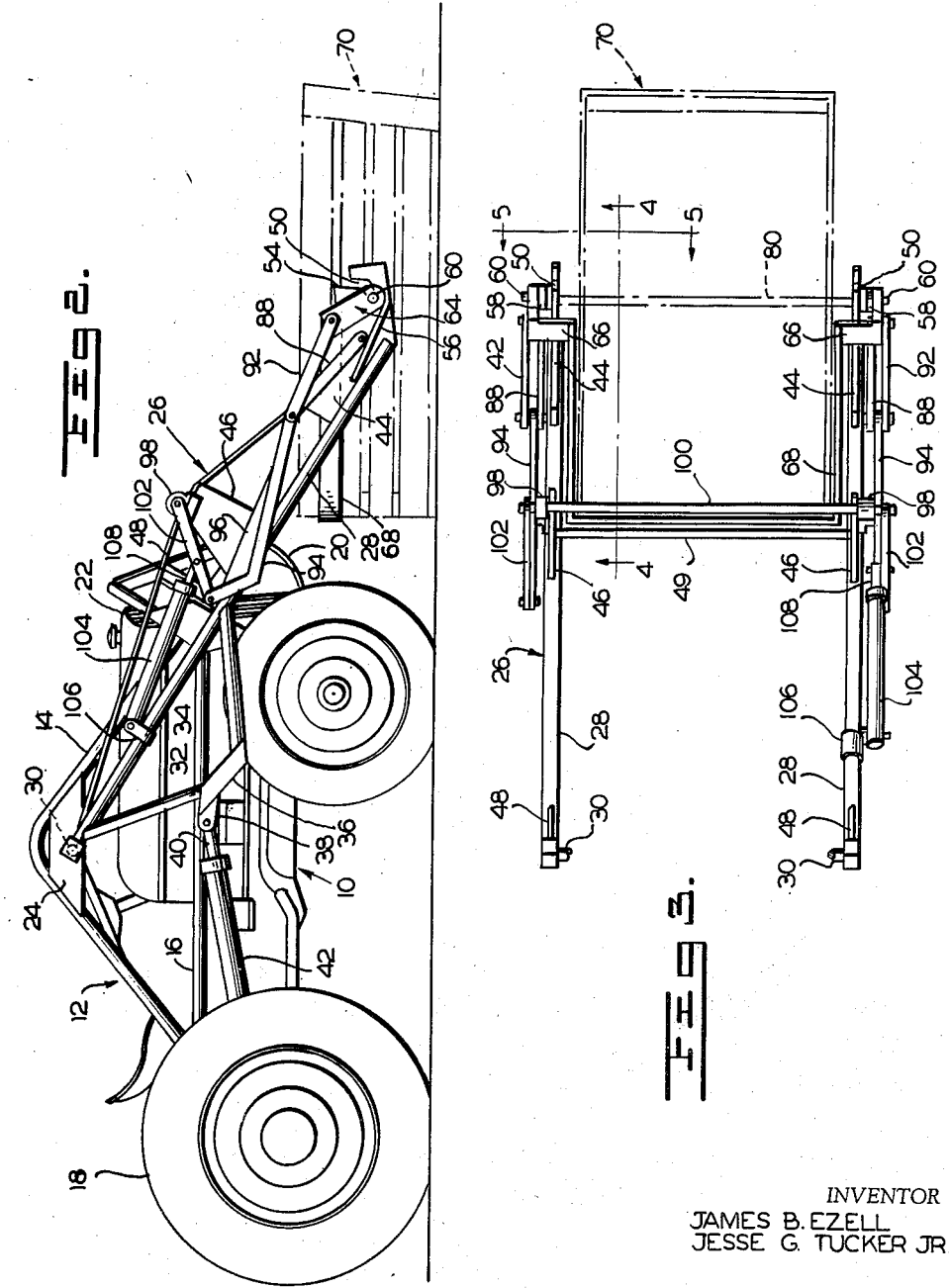
INVENTOR
JAMES B. EZELL
JESSE G. TUCKER JR.
BY Cushman, Darby & Cushman
ATTORNEYS

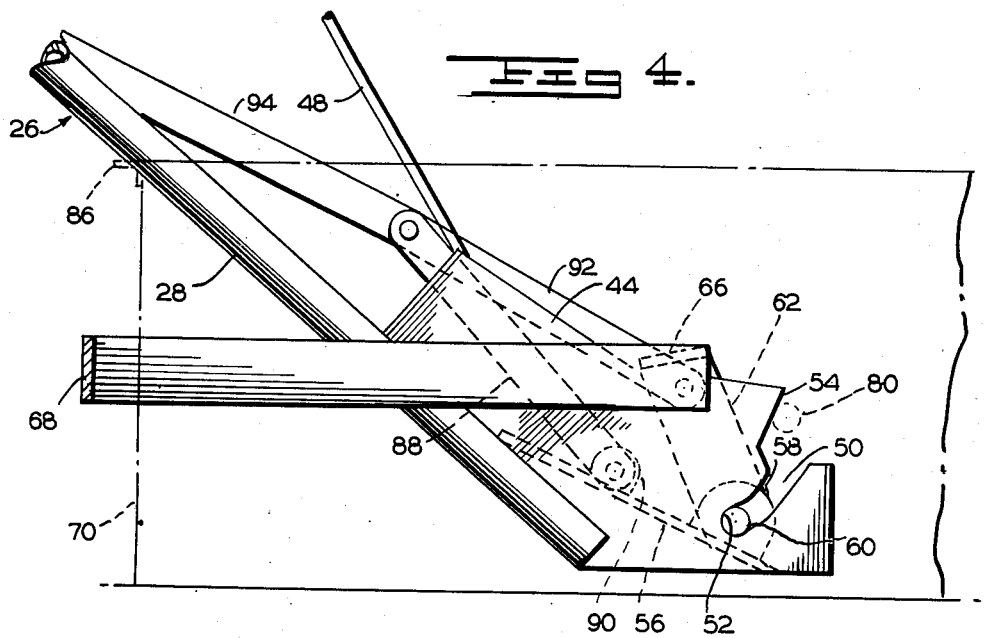
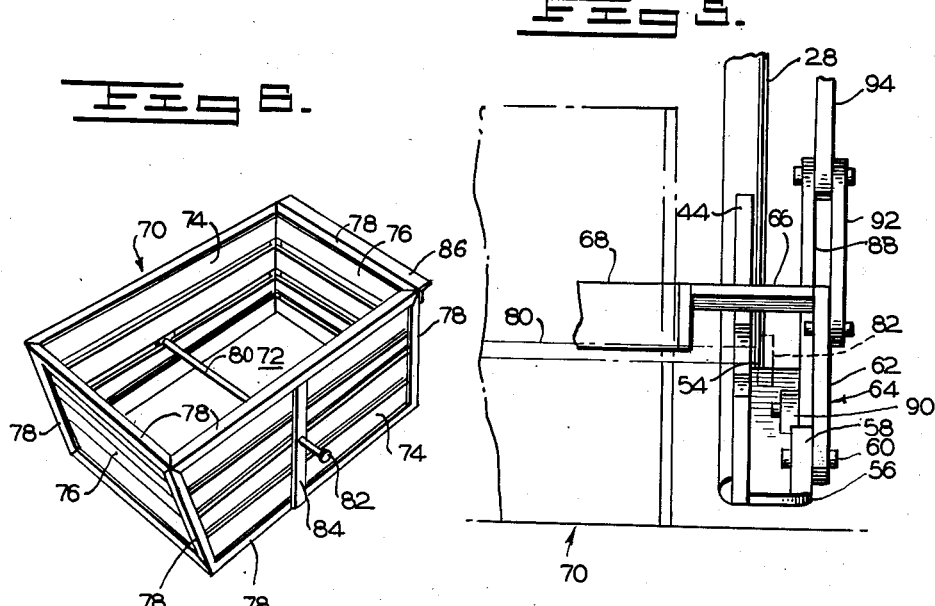

Patented Jan. 20, 1953

2,626,070

UNITED STATES PATENT OFFICE 2,626,070

MATERIAL HANDLING DEVICE

James B. Ezell and Jesse G. Tucker, Jr., Bradenton, Fla., assignors to Ezell Fruit Company, Bradenton, Fla., a corporation of Florida Application December 17, 1951, Serial No. 262,024

11 Claims. (Cl. 214—313)

This invention relates to material handling equipment, and more particularly to a special power lift attachment for a tractor and a special container detachably engageable and tiltingly controllable thereby.

The harvesting of fruit crops presents a problem in the collection of the fruit, after the same has been picked, and its transportation to collection points. Heretofore a large labor force was needed for such collection and transportation to waiting trucks or other vehicles for subsequent transportation to shipping points, storage, or market. Further, fruit in bulk is quite heavy and normally requires considerable manual effort to load the same into waiting vehicles.

It is, therefore, an object of this invention to provide a material handling device especially designed to facilitate and expedite the harvesting of fruit in an orchard.

It is another object of this invention to provide a power lift attachment for a tractor and a receptacle readily detachably engageable by the power lift device and which may be tiltingly controlled by the latter during such lifting engagement for transporting fruit in bulk and dumping the same into a truck or the like.

It is another object of this invention to provide improved material handling equipment of the type under consideration which is relatively simple, and consequently inexpensive in design, for facilitating the handling of material in bulk.

Other objects and advantages of the invention will be apparent from the following description and accompanying drawings, in which:

Figure 2 is a side elevational view corresponding to Figure 1, but showing the power lift device in its lowered position to engage with and lift the receptacle from the ground.

Figure 3 is a top plan view of the boom portion of the power lift device shown in Figure 2.

Figure 4 is an enlarged fragmentary detail view taken substantially on the line 4—4 of Figure 3 but showing the lifting mechanism in the position assumed in approaching the box structure prior to lifting engagement therewith.

Figure 5 is an enlarged fragmentary detail view taken substantially on the line 5—5 of Figure 3 but illustrating the relative positions of the parts shown in Figure 4.

Figure 6 is a perspective view of a special box structure for use with a power lift device embodying this invention.

Figure 1:
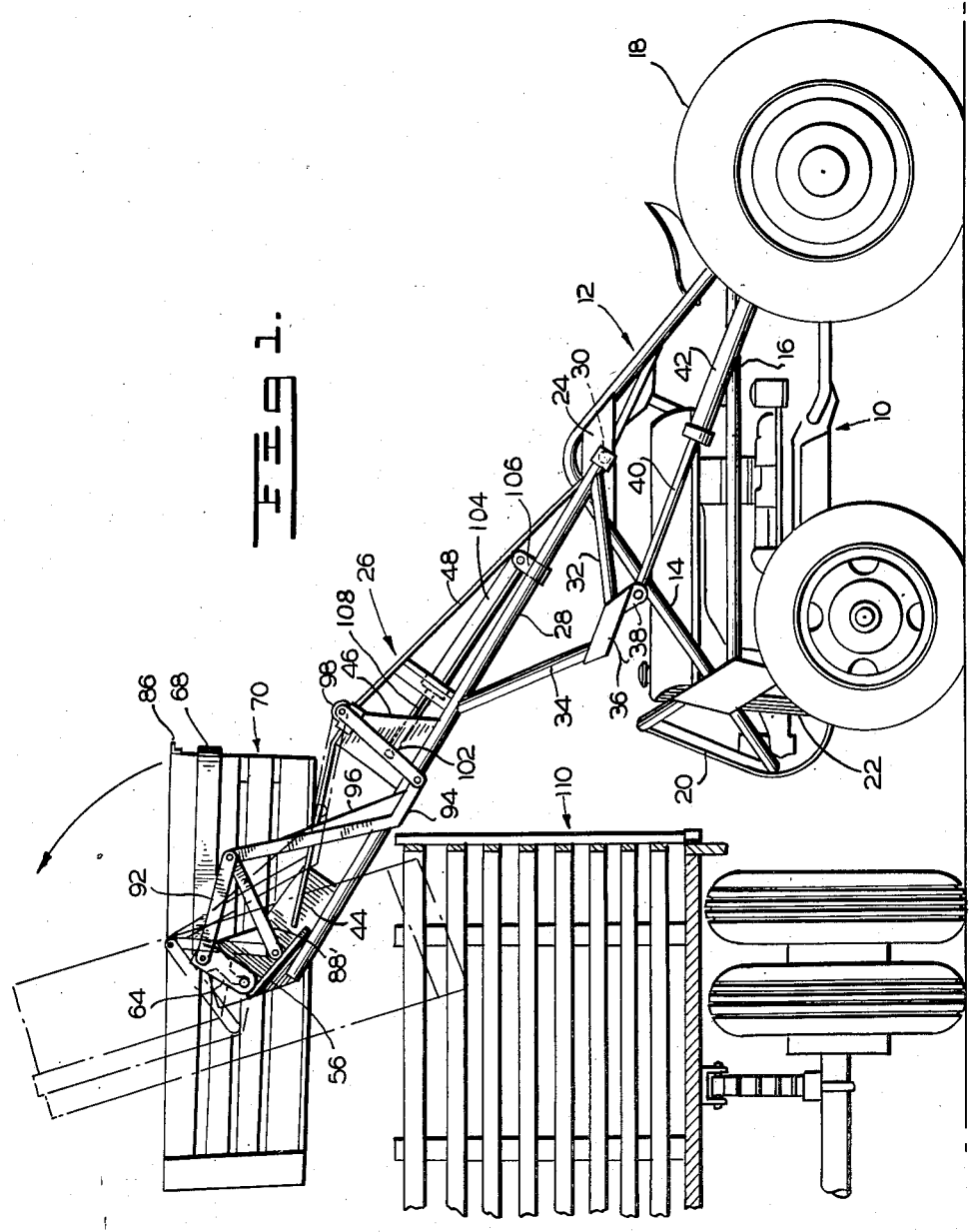
Figure 1 is a side elevational view of a tractor power lift device and receptacle embodying this invention, and shown in elevated position to dump a load of fruit into a vehicle.

Although this invention is described and illustrated with respect to the handling of fruit, it will be realized that the invention is susceptible of use for the handling of other types of material, as will become evident hereinafter.

Referring now to the drawings, there is shown in Figures 1 and 2 a tractor 10 having a boom-supporting framework structure 12 mounted thereon. The framework structure 12 comprises a pair of laterally spaced inverted V-shaped tubular elements 14, each having its depending legs connected, at their lower ends, by a horizontal tubular element 16. The rear of this framework structure 12 is detachably secured to and supported on the rear axle housing of the tractor 10, at points adjacent the rear wheels 18 of the latter, while the front end of the framework structure is provided with a cage-like construction 20 that encloses the radiator 22 and is connected to and supported on the tractor frame adjacent the forward end thereof. Preferably, all of the elements forming the framework structure 12 are welded into a rigid unit.

Each tubular element 14 is provided, below its apex, with a plate 24, welded or otherwise suitably secured thereto, for pivotally supporting a trussed boom 26. The boom 26 comprises a pair of spaced parallel tubular arms 28 connected at their rearward ends by a pivot rod 30 that is journalled transversely through the plates 24. The top of the frame structure 12 is suitably braced transversely by a rod (not shown) welded to and extending between the plates 24 parallel to the pivot rod 30. Each arm 28 of the boom is provided with depending and converging tubular members 32 and 34 welded together at their outer ends by side plates 36. The plates 36 are provided with a bracket 38 to which is pivotally connected the piston rod 40 of an hydraulic cylinder 42 having its rearward end pivotally connected to the tractor rear axle housing adjacent the point of connection of the frame structure 12 thereto. The cylinders 42 are supplied with pressure fluid from an appropriate hydraulic pump (not shown) mounted on the tractor 10 and driven by a power takeoff so that the admission and exhaust of pressure fluid to the cylinders 42 by appropriate controls (not shown) serves to elevate and lower the boom 26 under the control of the operator.

The particular tractor-mounted framework structure 12 and power lift mounting of the boom 26 shown and described thus far are described more in detail in U. S. Patent No. 2,495,144 and are merely illustrative of one type of vehicle-mounted power-lift device which may embody this invention.

The forward end of each arm 28 of the boom 26 is provided with an upright longitudinal flange-like plate 44, securely welded or otherwise suitably secured thereto and projecting forwardly thereof. The under edge of the projecting portion of each plate 44 is substantially horizontal when the boom 26 is in its lowermost position, as best shown in Figure 4. Intermediate the ends of each arm 28 there is secured a plate-like vertical strut 46 which supports the central portion of a guy member 48 having its rear and forward ends secured to the rear end of the tubular arm and to the forward plate 44, respectively. The boom 26 is further strengthened by a lateral strut 49 (Figure 3) securely welded to and extending between the vertical struts 46. Each plate 44 is provided, adjacent its forward end, with a notch 50 in its upper edge, which notch extends downwardly and rearwardly from a flaring mouth or entrance to define a semi-circular recess 52 (Figure 4) at the bottom thereof, for purposes later described. Just rearwardly of the flaring entrance of such notch 50 the plate is provided with a substantially vertical edge 54, the purpose of which will become more evident hereinafter.

Welded or otherwise suitably secured to the outer side of each plate 44 is a shelf-like flange 56 which diverges upwardly at a small angle with respect to the tubular boom arm 28. Aligned with the recess 52 at the bottom of the notch 50 and mounted on the flange 56 adjacent the outer edge thereof is an upstanding apertured ear or bearing member 58, best shown in Figures 4 and 5. Pivotally connected to the bearing member 58, by means of a pivot pin 60, is one leg 62 of an L-shaped arm 64 having the other leg 66 thereof extending inwardly of the boom arm 28, as best shown in Figures 3, 4, and 5. The legs 62 of the arms 64 are long enough to permit the legs 66 to clear the forward ends of the plates 44 when the arms 64 are swung forwardly about their pivots. A substantially U-shaped rigid strap 68 is disposed between the boom arms 28 and has the ends of its legs securely fastened, as by welding, to the inner ends of the legs 66 of the L-shaped arms 64.

For use in conjunction with the power-lift apparatus thus far described there is provided a box-like receptacle 70, best shown in Figure 6. This receptacle consists of a box having a bottom, side, and end walls, 72, 74, and 76, respectively, which may be formed of wood slats or the like, and may be appropriately reinforced by angle irons 78 along its edges. The side 74 and at least one of the end walls 76 are vertical, while, if desired, the other end wall may be upwardly divergent, as shown, to facilitate dumping as later described. Extending transversely through the side walls 74 of the box 70, midway between the ends 76 and substantially midway (or slightly therebelow) of the height thereof is a rod 80 having ends which project somewhat outwardly beyond the side walls 74 and are provided with circumferential enlargements 82. Preferably, for reinforcing purposes the box 70 is provided with a metallic substantially U-shaped strap 84 which extends transversely beneath the bottom wall 72 and upwardly exteriorly of the side walls 74. The upwardly extending legs of such strap 84 are suitably apertured for reception of the transverse rod 80. Additionally, the reinforcing angle iron 78 on the upper edge of the vertical end wall 76 preferably has an outer flange 86 for reasons later apparent.

From the structure thus far described it will be seen that the boom 26 may be lowered to align the notches 50 in the plates 44 beneath the projecting ends of the rod 80 on the box 70, as possibly best shown in Figure 4. In this connection it will be noted that the plate vertical edges 54 adjacent the entrance end of the notches 50 serve to aid the tractor operator in properly positioning the boom 26 with respect to the projecting ends of the rod 80. Elevation of the boom 26 thereupon serves to engage the recesses 52 at the lower ends of the notches 50 with the projecting ends of the rod 80 and with the enlargements 82 on the latter positioned between the bearing members 58 and the plates 44, so that the box 70 may be lifted by the boom. At the same time it will be noted that the U-shaped strap 68 extends closely around the vertical end wall 76 of the box substantially parallel to the bottom 72 thereof and with the base or rearward portion of the strap closely engaging the said vertical end wall. Hence, it will be evident that the box 70 is supported on the boom 26 for tilting about a horizontal axis by means of the rod and notch engagement, and that positive control of the pivotal movement of the U-shaped strap 68 will serve to control the pivotal position of the box with respect to the boom. In this connection it is pointed out that the flange 86 on the upper end edge of the box may serve as a stop, in some instances, to prevent relative pivotal movement between the box and the strap 68.

For controlling the pivotal movement of the strap 68 there is provided a linkage arrangement on each boom arm 28 that is suitably connected to the U-shaped strap. For this purpose a link 88 has one end thereof pivotally connected to an upstanding apertured ear or bearing member 90 on the outer flange 56 rearwardly of the bearing member 58. The other end of the link 88 has another link 92 pivotally connected thereto, which link 92 is also pivotally connected to the leg 62 of the L-shaped arm 64 above the point of the latter's pivotal connection to the bearing member 58. This arrangement provides a substantially parallelogram linkage which may be controlled in any number of ways. As best shown in Figures 1 and 2, however, a long bent link 94 is pivotally connected to the point of pivotal connection of the links 88 and 92. The bend in this link 94 may be reinforced by means of a web-like flange 96. Mounted in bearing members 98 secured on top of the vertical boom struts 46 is a transverse shaft 100 having crank arms 102 on the opposite ends thereof which are pivotally connected to the rear ends of the links 94. A hydraulic cylinder 104 has the rearward end thereof pivotally mounted, as by means of a suitable bracket 106, on one of the boom arms 28 and has its projecting piston rod 108 pivotally connected to one of the crank arms 102, intermediate the ends of the latter. The hydraulic cylinder 104 is supplied with pressure fluid from the same source as that supplying the hydraulic lift cylinders 42 and such fluid supply is controlled by an appropriate valve control (not shown) located adjacent the controls for the hydraulic lift cylinders. If desired a second hydraulic cylinder 104 may be mounted on the other boom arm and similarly connected to the other crank arm for operation in unison with the other cylinder 104.

It will thus be seen that the hydraulic cylinder 104 controls the pivotal position of the U-shaped strap 68 with respect to the boom 26. Hence, when a box 70 has been engaged by the boom 26, operation of the control for the hydraulic cylinder 104 serves to maintain such box in a horizontal or level position when lifted by the boom for transportation by the tractor 10. When it is desired to dump the contents of the box into a waiting vehicle, such as the truck 110 shown in Figure 1, the boom 26 is appropriately elevated by means of the hydraulic lift cylinders 42 and the box positioned over the bin-like truck body. Thereupon, operation of the hydraulic cylinder 104 to further extend its piston rod 108 actuates the linkages to tilt the box sufficiently to dump its contents into the truck 110, as best shown in Figure 1. In this connection the upwardly divergent end wall 76 of the box serves to reduce the dumping angle.

In operation of a material handling device embodying this invention for the harvesting of fruit, a number of boxes 70 will be spaced throughout an orchard to be filled by the pickers. As soon as a box is full, the tractor will be used to lift the box and transport the same to a waiting vehicle, and after its contents have been dumped, the box will be returned by the tractor to an appropriate location for refilling by the pickers. Hence, all of the boxes may be rapidly driven to the truck, dumped, and returned to a point of further use without undue delay and without requiring a large labor force to perform this function, since only one man is necessary to operate the material handling device embodying this invention.

It will thus be seen that the objects of this invention have been fully and effectively accomplished. It will be realized, however, that the specific embodiment of the invention shown for illustrating the principles thereof is susceptible of change without departure from such principles. Therefore, this invention embraces all modifications which are encompassed by the spirit and scope of the following claims.

We claim:

1. In a material handling device for use with an open top box structure having a pair of aligned stub-rod-like projections on opposite sides thereof, the combination comprising: power-operable load lifting means having a pair of spaced parallel arms provided with a pair of aligned recesses in their upper sides, adjacent their ends, for detachable lifting and pivotal engagement with the box structure projections; a rigid U-shaped strap positioned between said arms and having the legs thereof pivotally connected to said arms, adjacent the outer sides thereof, for pivotal movement of said strap about an axis substantially aligned with the bottom portions of said recesses, said strap being shaped to extend about one end of the box with the strap base in engagement therewith; and power means mounted on said load-lifting means and connected to said strap for controlling the pivotal position thereof.

2. The structure defined in claim 1 in which the power means includes a hydraulic cylinder mounted on the load lifting means and linkage means connecting said cylinder to the strap.

3. In a material handling device for use with an open top box structure having a pair of aligned stub-rod-like projections on opposite sides thereof, the combination comprising: a power-lift boom pivotally attachable to a vehicle having power means for raising and lowering said boom, the forward end of said boom terminating in a pair of spaced parallel arms; means defining notches in the upper sides of said arms adjacent their ends for lifting and pivotal engagement with the box structure projections; a rigid U-shaped strap disposed between said arms and having the legs thereof connected to said arms for pivotal movement of said strap about an axis aligned with the lower portions of said notches, said strap being adapted to extend around one end of the box with the base of said strap in engagement therewith; and power means mounted on said boom and connected to said strap for controlling the pivotal position thereof.

4. In a material handling device for use with an open top box structure having a pair of aligned stub-rod-like projections on opposite sides thereof, the combination comprising: a power-lift boom pivotally attachable to a vehicle having power means for raising and lowering said boom, the forward end of said boom terminating in a pair of spaced parallel arms; a longitudinal upstanding flange on the forward end of each arm having a downwardly converging notch in the upper edge thereof which terminates in a rearwardly offset recess for lifting and pivotal engagement with the box structure projections; a rigid U-shaped strap adapted to receive and closely extend around one end of the box structure substantially parallel to the bottom thereof; outwardly offset arms rigidly secured to the ends of the legs of said strap and extending downwardly therefrom; means connecting the lower ends of said offset arms to said boom arms outwardly of said flanges for pivotal movement about the axis of said flange recesses; a hydraulic cylinder mounted on said boom; and linkage means connecting said cylinder to said offset arms for effecting pivotal movement of the latter, and thereby of said strap, to pivot the box structure about a horizontal axis when carried by said boom.

5. A material handling apparatus for detachably lifting and carrying, elevating into a position over a truck body, dumping thereinto, returning to carrying position, and releasing at a desired location each of a plurality of like open-top receptacles each having a pair of pivot studs projecting outwardly from opposite sides thereof, comprising: a tractor; hydraulic power means carried thereby; a boom pivotally attached to said tractor and connected to said power means for vertical swinging movement thereby into an elevated position over a truck body; said boom comprising spaced arms having free forward ends located beyond the front end of said tractor, said arms being adapted to straddle the opposite sides of a receptacle by substantially horizontal forward movement of said tractor; means rigid on said arms adjacent their forward ends defining a pair of upwardly-opening recesses for readily and detachably receiving the receptacle pivot studs in pivotal and lifting engagement by upward swinging movement of said boom; lever means mounted on said arms adjacent the forward end thereof for pivotal movement about a horizontal axis, said lever means extending rearwardly and substantially horizontally and having a rear portion detachably engageable with the receptacle at a location spaced rearwardly a substantial distance from the pivot studs thereof, said engagement being effective to positively rotate the receptacle in both angular directions about the axis of its pivot studs by swinging movement of said lever means; and hydraulic power means mounted on said boom and connected to said lever means for swinging said rear portion thereof upwardly and forwardly about said horizontal axis to dump material from the receptacle after the latter has been elevated by said boom, and downwardly and rearwardly to return the receptacle to carrying position on said arms.

6. In a material handling apparatus for detachably lifting and carrying, elevating over a truck body, dumping thereinto, returning to carrying position, and releasing at a desired location each of a plurality of like open-top receptacles each having a pair of trunnions projecting outwardly from opposite sides thereof, the combination comprising: a power-lift boom pivotally attachable for vertical swinging movement to a tractor having power means for effecting such movement and with said boom projecting forwardly of the front end of the tractor for upward swinging into an elevated position over a truck body, the forward end of said boom including a pair of spaced arms having free forward ends and adapted to straddle the opposite sides of a receptacle upon substantially horizontal forward movement of the tractor; means rigid on said arms adjacent their free ends defining a pair of upwardly-opening recesses for detachably receiving the receptacle trunnions in lifting and pivotal engagement by upward swinging movement of said boom; lever means pivotally mounted on both of said arms adjacent the forward ends thereof for swinging movement about a horizontal axis, said lever means including rearwardly and substantially horizontally-extending arms on opposite sides of the receptacle having rear portions detachably engageable with the receptacle at a location spaced rearwardly of the center of gravity of the receptacle, said engagement being effective to positively rotate the receptacle in both angular directions about the axis of its trunnions by swinging movement of said lever means; and a hydraulic power cylinder pivotally connected to said boom and to said lever means to swing said arms thereof upwardly and forwardly about said horizontal axis to tilt the receptacle forwardly about its trunnions to dump material therefrom after the receptacle has been elevated by upward movement of said boom, and downwardly and rearwardly to return the receptacle to carrying position on said boom arms.

7. In a material handling apparatus for detachably lifting and carrying, elevating over a truck body, dumping thereinto, returning to carrying position, and releasing at a desired location each of a plurality of like open-top receptacles each having a pair of trunnions projecting outwardly from opposite sides thereof, the combination comprising: a power-lift boom pivotally attachable for vertical swinging movement to a tractor having power means for effecting such movement and with said boom projecting forwardly of the front end of the tractor for upward swinging into an elevated position over a truck body, the forward end of said boom including a pair of spaced arms having free forward ends and adapted to straddle the opposite sides of a receptacle upon substantially horizontal forward movement of the tractor; means rigid on said arms adjacent their free ends defining a pair of upwardly-opening recesses for detachably receiving the receptacle trunnions in lifting and pivotal engagement by upward swinging movement of said boom; lever means pivotally mounted on said arms adjacent the forward end thereof for swinging movement about a horizontal axis, said lever means extending rearwardly and substantially horizontally and having a rear portion provided with an upwardly-facing surface and a downwardly-facing surface both detachably engageable with surfaces on the receptacle at locations rearward of its trunnions, said engagements being effective to positively rotate the receptacle in both angular directions about the axis of its trunnions by swinging movement of said lever means; and hydraulic power means pivotally connected to said boom and to said lever means to swing said rear portion thereof upwardly and forwardly about said horizontal axis to tilt the receptacle forwardly about its trunnions to dump material therefrom after the receptacle has been elevated by upward movement of said boom, and downwardly and rearwardly to return the receptacle to carrying position on said arms.

8. A material handling apparatus for detachably lifting and carrying, elevating into a position over a truck body, dumping thereinto, returning to carrying position, and releasing at a desired location each of a plurality of like open-top receptacles each having a pair of pivot studs projecting outwardly from opposite sides thereof, comprising: a tractor; hydraulic power means carried thereby; a boom pivotally attached to said tractor and connected to said power means for vertical swinging movement thereby into an elevated position over a truck body, said boom comprising spaced arms having free forward ends located beyond the front end of said tractor, said arms being adapted to straddle the opposite sides of a receptacle by substantially horizontal forward movement of said tractor; means rigid on said arms adjacent their forward ends defining a pair of upwardly-opening recesses for readily and detachably receiving the receptacle pivot studs in pivotal and lifting engagement by upward swinging movement of said boom; lever means mounted on said arms adjacent the forward end thereof for pivotal movement about a horizontal axis, said lever means extending rearwardly and substantially horizontally and having a rear portion detachably engageable with the receptacle at a location spaced rearwardly a substantial distance from the pivot studs thereof, said engagement being effective to positively rotate the receptacle in both angular directions about the axis of its pivot studs by swinging movement of said lever means, and said lever means rear portion having a forwardly-facing surface detachably engageable with a rearwardly-facing surface on the receptacle to limit approaching movement of said tractor relative thereto; and hydraulic power means mounted on said boom and connected to said lever means for swinging said rear portion thereof upwardly and forwardly about said horizontal axis to dump material from the receptacle after the latter has been elevated by said boom, and downwardly and rearwardly to return the receptacle to carrying position on said arms.

9. In a material handling apparatus for detachably lifting and carrying, elevating over a truck body, dumping thereinto, returning to carrying position, and releasing at a desired location each of a plurality of like open-top receptacles each having a pair of trunnions projecting outwardly from opposite sides thereof, the combination comprising: a power-lift boom pivotally attachable for vertical swinging movement to a tractor having power means for effecting such movement and with said boom projecting forwardly of the front end of the tractor for upward swinging into an elevated position over a truck body, the forward end of said boom including a pair of spaced arms having free forward ends and adapted to straddle the opposite sides of a receptacle upon substantially horizontal forward movement of the tractor; means rigid on said arms adjacent their free ends defining a pair of upwardly-opening recesses for detachably receiving the receptacle trunnions in lifting and pivotal engagement by upward swinging movement of said boom; lever means pivotally mounted on said arms adjacent the forward end thereof for swinging movement about a horizontal axis, said lever means extending rearwardly and substantially horizontally and having a rear portion provided with an upwardly-facing surface and a downwardly-facing surface both detachably engageable with surfaces on the receptacle at locations rearward of its trunnions, said engagement being effective to positively rotate the receptacle in both angular directions about the axis of its trunnions by swinging movement of said lever means, and said lever means rear portion having a forwardly-facing surface detachably engageable with a rearwardly-facing surface on the receptacle to limit approaching movement of the tractor relative thereto; and hydraulic power means mounted on said boom and connected to said lever means to swing said rear portion thereof upwardly and forwardly about said horizontal axis to tilt the receptacle forwardly about its trunnions to dump material therefrom after the receptacle has been elevated by upward movement of said boom, and downwardly and rearwardly to return the receptacle to carrying position on said arms.

10. A material handling device comprising: an open-top box structure having a pair of aligned stub-rod-like projections on opposite sides thereof; power-operable load-lifting means having a pair of spaced arms adapted to straddle said box structure; means rigid on said arms for effecting readily detachable lifting and pivotal engagement of said arms with said box structure projections by lifting movement of said arms; a rigid U-shaped strap detachably engaged with and extending closely around one end of said box structure; means connecting the strap legs to said arms for pivotal movement of said strap substantially about the axis of pivotal engagement of said arms with said box structure projections; and power-operated means mounted on said load-lifting means and connected to said strap for pivoting the latter.

11. The structure defined in claim 10 in which the box structure includes an outer flange extending across one end thereof above the base of the strap for engagement with said base, said flange serving as a stop to limit relative pivotal movement between said box structure and said strap.

JAMES B. EZELL.
JESSE G. TUCKER, Jr.

REFERENCES CITED

The following references are of record in the file of this patent:

UNITED STATES PATENTS

| Number | Name | Date |
|---|---|---|
| 1,753,756 | Small | Apr. 8, 1930 |
| 1,852,200 | Camp | Apr. 5, 1932 |
| 1,982,367 | Brown | Nov. 27, 1934 |
| 1,988,259 | Albaugh | Jan. 15, 1935 |
| 2,164,739 | Gerosa et al. | July 4, 1939 |
| 2,379,797 | Gilbert | July 3, 1945 |
| 2,413,661 | Stokes | Dec. 31, 1946 |
| 2,458,195 | Pearse | Jan. 4, 1949 |
| 2,497,385 | Young et al. | Feb. 14, 1950 |
| 2,517,582 | Lull | Aug. 8, 1950 |
| 2,524,048 | Furnas | Oct. 3, 1950 |
| 2,603,374 | McNamara, Jr. | July 15, 1952 |
| 2,606,680 | Herman | Aug. 12, 1952 |

FOREIGN PATENTS

| Number | Country | Date |
|---|---|---|
| 624,460 | Great Britain | June 9, 1949 |